US006677885B1

United States Patent
Frankot

(10) Patent No.: US 6,677,885 B1
(45) Date of Patent: Jan. 13, 2004

(54) METHOD FOR MITIGATING ATMOSPHERIC PROPAGATION ERROR IN MULTIPLE PASS INTERFEROMETRIC SYNTHETIC APERTURE RADAR

(75) Inventor: Robert T. Frankot, Tucson, AZ (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 10/335,682

(22) Filed: Jan. 2, 2003

(51) Int. Cl.[7] .............................................. G01S 13/90
(52) U.S. Cl. ........................ 342/25; 342/194; 342/195
(58) Field of Search ........................... 342/25, 120, 123, 342/127, 135, 191, 194, 195

(56) References Cited

U.S. PATENT DOCUMENTS

| | | | | |
|---|---|---|---|---|
| 5,332,999 A | * | 7/1994 | Prati et al. ..................... | 342/25 |
| 5,394,151 A | * | 2/1995 | Knaell et al. .................. | 342/25 |
| 5,677,693 A | * | 10/1997 | Frankot et al. ............... | 342/25 |
| 5,945,937 A | * | 8/1999 | Fujimura ..................... | 342/25 |
| 6,097,328 A | * | 8/2000 | Frankot ........................ | 342/25 |
| 6,573,856 B1 | * | 6/2003 | Obenshain ................... | 342/25 |

OTHER PUBLICATIONS

"Improved multilook technique applied to SAR images", Grandchamp, M.; Cavassilas, J.-F.; Acoustics, Speech, and Signal Processing, 1997. ICASSP-97., 1997 IEEE Int'lConference on, vol. 4, Apr. 21–24, 1997 Ps: 2821–2824.*

"DEM generation using ERS-1/2 interferometric SAR data", Shi Shiping; Geoscience and Remote Sensing Symposium, 2000. Proceedings. IGARSS 2000. IEEE2000 International , vol.:2 , Jul. 24–28, 2000 Ps: 788–790.*

* cited by examiner

Primary Examiner—John B. Sotomayor
(74) Attorney, Agent, or Firm—Leonard A. Alkov; Glenn H. Lenzen, Jr.

(57) ABSTRACT

Signal processing methods useful in single-antenna multiple-pass interferometric synthetic aperture radars. The signal processing methods compute an initial elevation estimate from the phase difference between a pair of images ($A_0$, $A_1$) with a relatively small elevation angle difference (i.e., a short interferometric baseline) and uses it to initialize the elevation estimation process for pairs of images ($A_0$, $A_2$) with longer interferometric baselines. The method may be used to process images that are coherent, or not necessarily mutually coherent. The outputs of the methods comprise a terrain elevation map that mitigates for atmospheric error and a turbulence map.

5 Claims, 3 Drawing Sheets

METHOD FOR MITIGATING ATMOSPHERIC PROPAGATION ERROR IN MULTIPLE PASS INTERFEROMETRIC SYNTHETIC APERTURE RADAR

BACKGROUND

The present invention relates to synthetic aperture radar systems, and more particularly, to a signal processing method for use with a single-antenna multiple-pass interferometric synthetic aperture radar that mitigates atmospheric propagation error.

Prior art relating to the present invention includes traditional surveying methods, including on the ground survey with chain and transit, stereoscopic aerial photography, stereoscopic synthetic aperture radar (SAR) imaging, and more recent developments including single pass, dual channel interferometric synthetic aperture radar (IFSAR) and dual pass, single channel IFSAR.

A previous IFSAR developed by the assignee of the present invention is disclosed in U.S. patent application Ser. No. 08/249,762 filed May 26, 1994, entitled "Multi-Pass and Multi-Channel Interferometric Synthetic Aperture Radars." The present invention is an augmentation and improvement to the IFSAR disclosed in this patent application. This invention operates a single channel SAR interferometer in a multiple-pass mode to achieve accuracy unobtainable by a two-pass interferometer. The terrain elevation measurement algorithm employed in this invention was optimized for low variance spatially uncorrelated phase errors typical of thermal noise. An additional multiple channel simultaneous interferometer configuration was also disclosed in this patent application.

Other related inventions of the assignee of the present invention address two or more passes of a two channel interferometer and are disclosed in U.S. Pat. No. 5,463,3978 entitled "Hyper-Precision SAR Interferometry Using a Dual-Antenna Multi-Pass SAR System. An atmospheric correction method for use in a two-channel interferometer is disclosed in U.S. Pat. No. 5,726,656, issued Mar. 10, 1998, entitled "An Atmospheric Correction Method for Interferometric Synthetic Array Radar Systems Operating at Long Ranges." The "Multi-Pass and Multi-Channel Interferometric Synthetic Aperture Radars" invention as well as conventional two-pass interferometry, such as is disclosed by F. Li and R. Goldstein, "Studies of Multi-baseline Spaceborne Interferometric Synthetic Aperture Radars," *IEEE Trans. Geocsience and Remote Sensing*, vol. 28, pp. 88–97, January 1990, suffers from accuracy limitations at very long ranges because of atmospheric inhomogeneities that change significantly during the time between the multiple passes.

In a single pass, dual channel interferometric synthetic aperture radar, one aircraft (or spacecraft) with two antennas collects SAR data from both antennas as disclosed by L. C. Graham, "Synthetic Interferometer Radar for Topographic Mapping", *Proc. IEEE*, Vol. 64, pp. 763–768, June 1974. While the single pass system is convenient it is often limited in sensitivity, especially at long ranges, due to the small difference in the grazing angles for each channel.

In a dual pass, single channel interferometric synthetic aperture radar, two passes are used to collect two SAR images. The grazing angle difference is under the control of the radar operators but with increased sensitivity comes increased ambiguity far beyond that of the single-pass dual-channel approach. The accuracy of this technique suffers because of phase errors due to time-varying atmospheric inhomogeneities.

Accordingly, it is an objective of the present invention to provide for a signal processing method that may be used with single-antenna multiple-pass interferometric synthetic aperture radars that mitigates atmospheric propagation error. It is a further objective of the present invention to provide for a signal processing method for use with single-antenna multiple-pass interferometric synthetic aperture radars that improves topographic mapping accuracy at very long ranges and, as a byproduct, provides an atmospheric turbulence measurement map.

SUMMARY OF THE INVENTION

To meet the above and other objectives, the present invention provides for signal processing method useful in single-antenna multiple-pass interferometric synthetic aperture radars. The signal processing methods compute an initial elevation estimate from the phase difference between a pair of images with a relatively small elevation angle difference (i.e., a short interferometric baseline) and uses it to initialize the elevation estimation process for pairs of images with longer interferometric baselines.

This processing allows the use of a larger elevation angle difference than would have previously be feasible so that a given level of phase error due to atmospheric inhomogeneities results in proportionately less terrain elevation measurement error. The residual phase between the long- and short-baseline interferometry data, suitably filtered, is attributable to the difference in effective atmospheric propagation paths along the line-of-sight of the radar between the times that the sequence of images were taken.

The present invention is optimized for atmospheric errors exhibiting high phase variance but long spatial correlation lengths. It may be applied as a modification of the previous processing method disclosed in U.S. patent application Ser. No. 08/249,762.

BRIEF DESCRIPTION OF THE DRAWINGS

The various features and advantages of the present invention may be more readily understood with reference to the following detailed description taken in conjunction with the accompanying drawings, wherein like reference numerals represent like structural elements, and in which.

DETAILED DESCRIPTION

Figure 1:
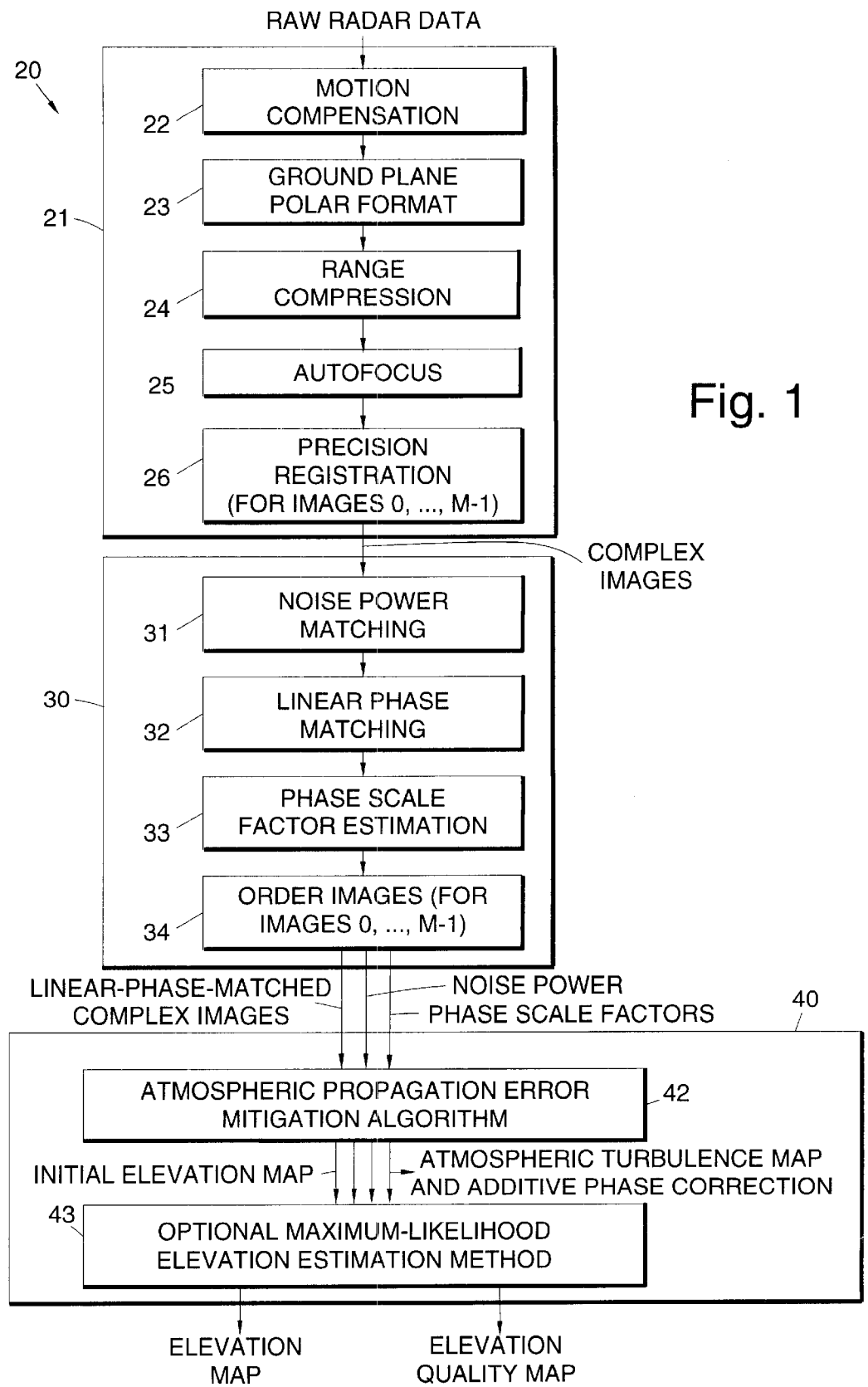
FIG. 1 illustrates single-antenna multiple-pass interferometric SAR processing method that implements the present invention.
Figure 2:
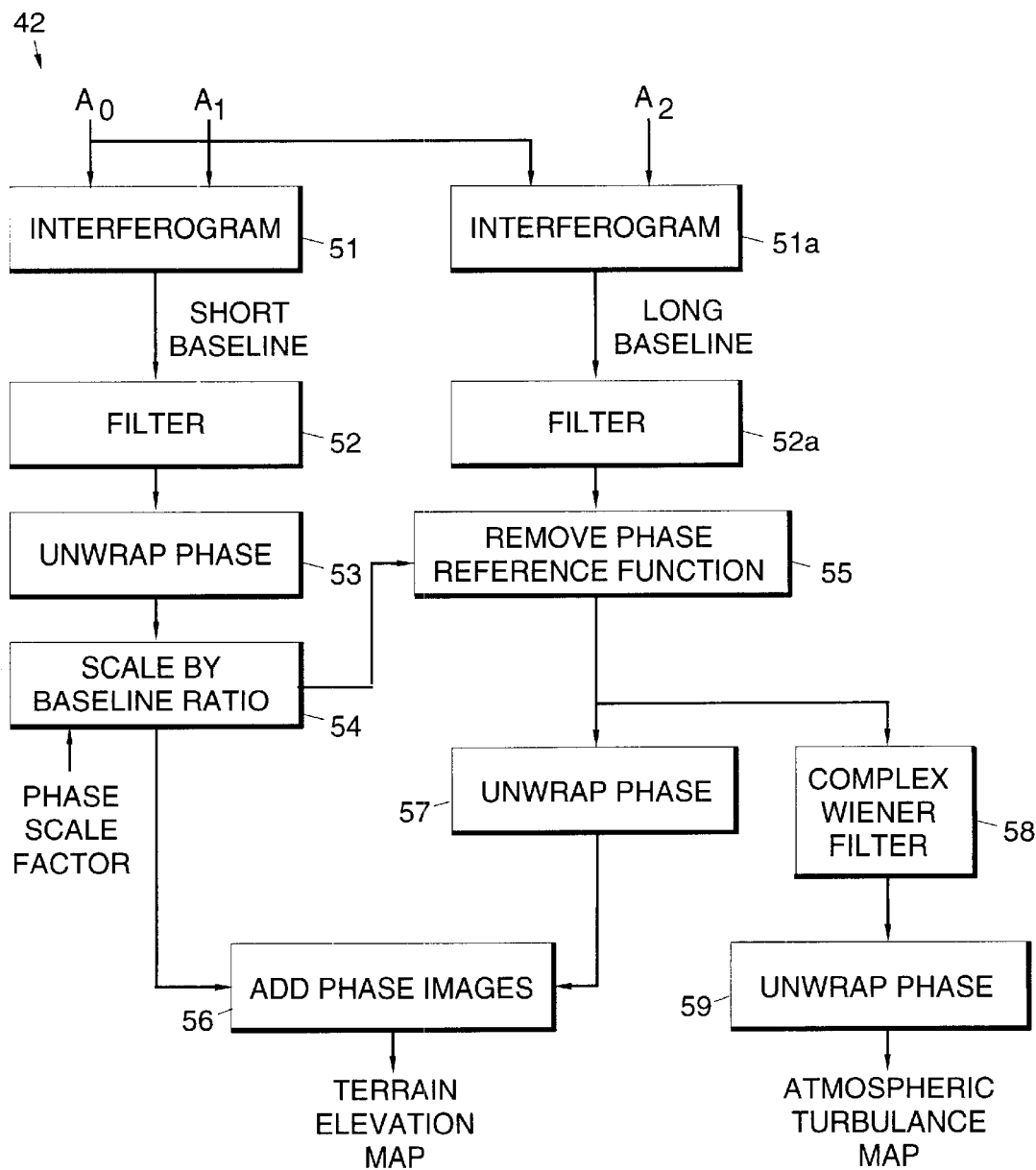
FIG. 2 illustrates atmospheric error mitigation and turbulence map computations in accordance with the present invention for the case of three coherent images.
Figure 3:
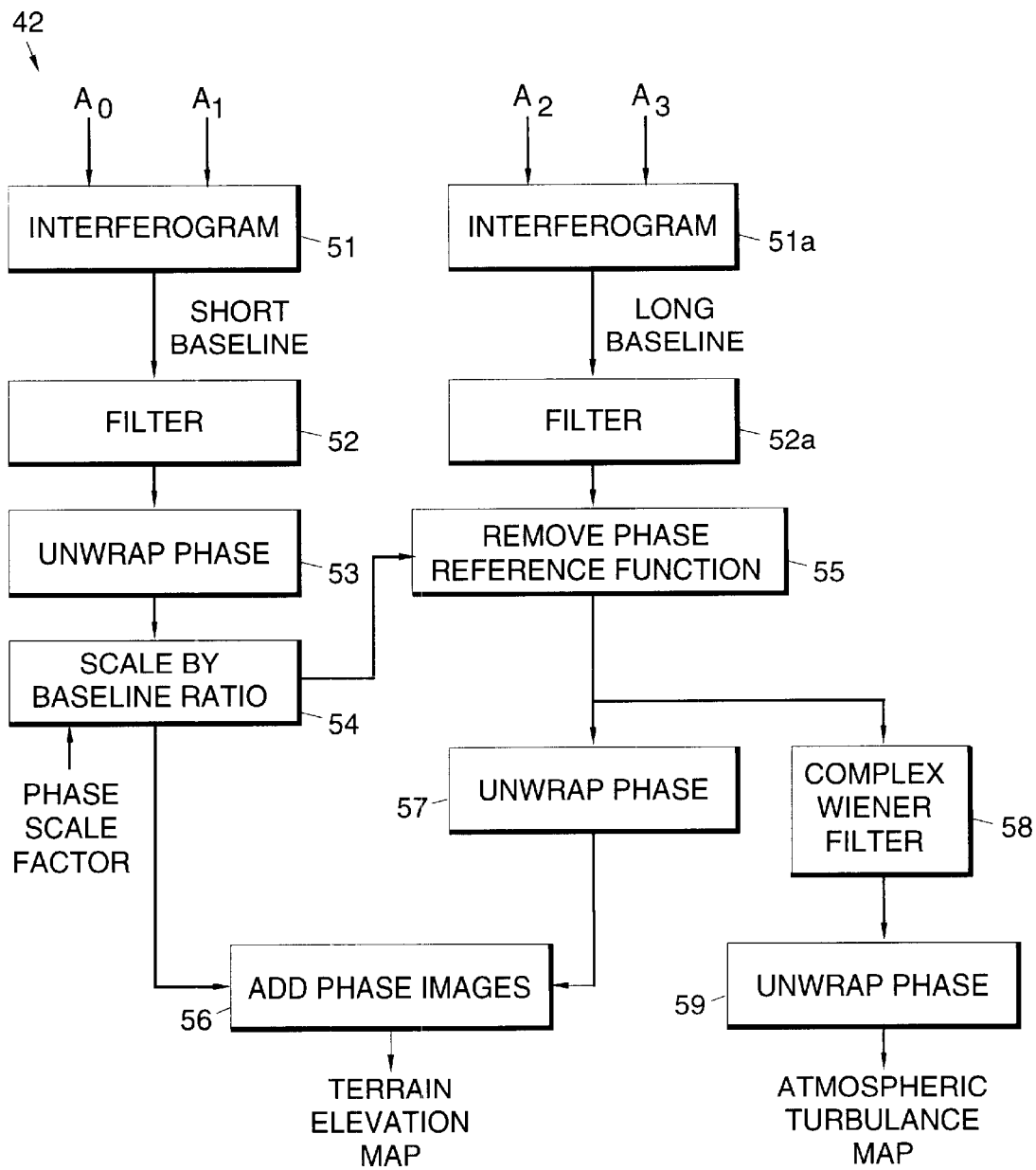
FIG. 3 illustrates atmospheric error mitigation and turbulence map computations in accordance with the present invention for the case of two coherent image pairs that are not necessarily all mutually coherent.

Referring to the drawing figures, FIG. 1 shows a single-antenna multiple-pass interferometric SAR processing method 20 that implements atmospheric propagation error mitigation processing method 40 or algorithm 40 in accordance with the principles of the present invention. The processing method 20 is similar to that disclosed in U.S. patent application Ser. No. 08/249,762, with a different terrain elevation estimation algorithm and slightly different guidelines on selection of interferometric baselines. The contents of U.S. patent application Ser. No. 08/249,762 are incorporated herein by reference in its entirety. FIGS. 2 and 3 show details for two variations of the atmospheric propagation error mitigation processing method 40 and illustrates how short baseline interferometry is used as an initialization (to resolve ambiguities) for long baseline interferometry, which is less sensitive to noise.

The atmospheric propagation error mitigation processing method 40 is used to augment the synthetic array radar (SAR) interferometer disclosed in U.S. patent application Ser. No. 08/249,762. The present invention adapts this prior processing method to process SAR images in the presence of spatially correlated but high variance phase errors attributable to atmospheric inhomogeneities.

The processing method 20 will be summarized to understand the inputs to the atmospheric propagation error mitigation processing method 40. A detailed understanding of the processing method 20 may be obtained from U.S. patent application Ser. No. 08/249,762.

The processing method 20 implemented using the present invention has three basic processing operations, identified as initial processing 21 that produces complex SAR images from raw SAR data, signal-based open-loop initial processing 30 that processes the complex SAR images to produce linear phase matched complex images and several processing parameters, and atmospheric propagation error mitigation processing 40 in accordance with the present invention that produces elevation and elevation quality maps as its output.

The initial processing 21 employed in the method 20 is as follows. Raw radar data is processed using conventional processing techniques to accomplish motion compensation (step 22), transform the data into ground plane polar format (step 23), and provide range compression (step 24), autofocus (step 25), and precision registration (step 26). These conventional processing techniques are well-known to those skilled in the SAR signal processing art and will not be described in detail.

The signal-based initial processing 30 employed in the method 20 is described in detail below. A mathematical model relates system inputs, the elevation (output) to be estimated, and processing parameters that are estimated. A description of this model will help to better understand the processing performed by the method 20.

Inputs to the present method 20 are multiple complex SAR images $A_m(r,v)$, $m=0, \ldots, M-1$ where r is range and v is azimuth or cross-range. Each $A_m(r,v)$ is a complex number. Outputs from the method 20 comprise an elevation image $u(r,v)$ in radar coordinates that is converted into a calibrated elevation map $z(x,y)$ in geodetic coordinates using conventional techniques. An elevation error standard deviation estimate $\sigma_u(r,v)$ is also provided.

The inputs to the method 20 are modeled as follows.

$$A_m(r, v) = \begin{cases} a\exp\{-j(B_{0m}u(r,v) + s_{rm}r + s_{vm}v + \phi_{0m}) + \eta_{(rv)} & \text{if } 0 < m \hat{\le} M-1 \\ a + \eta_0(rv) & \text{if } m = 0 \end{cases} \quad (1)$$

where $B_{0m}$ is the phase-difference scale factor relating elevation to the phase difference between $A_0$ and $A_m$, proportional to the grazing angle difference between collection geometries for $A_0$ and $A_m$, $s_{rm}$ and $s_{vm}$ are linear phase error coefficients in range and azimuth, respectively, $\phi_{0m}$ is an unknown random phase that is constant in (r,v). The function $\eta_m(r,v)$ denotes zero-mean random complex Gaussian noise with noise power $\sigma_m$, uncorrelated in m and only weakly correlated in (r,v).

The method 20 computes an estimated elevation $u(r,v)$ as its output, and also estimates the parameters $B_{0m}$, $s_{rm}$, $S_{vm}$, $\phi_{0m}$, and $\sigma_m$ to provide for superior elevation accuracy.

After completing the initial processing 21 to produce the complex images (steps 22–26), the signal-based initial processing 30 is performed as follows. Noise power is computed (step 31). Linear phase matching (step 32), and phase-difference scale factor ratios (step 33) are then determined.

During the signal-based initial processing 30, only relative values of the linear phase and phase scale factors are known. This allows accurate estimation of relative, not absolute, elevation. All elevation estimates share a common, unobservable error that may be calibrated through conventional means to produce a calibrated height or elevation map.

Noise power (gain) matching (step 31) is achieved as follows. The noise power matching step 31 normalizes the SAR images to compensate for differences in gain of the of the synthetic aperture radar from scan to scan. System gain $G_m$ is estimated using the average magnitude of the $m^{th}$ image, for example. The following normalization is then performed $$A_m(r, v) \leftarrow \frac{A_m(r, v)}{G_m}. \quad (2)$$

Noise variance estimation is achieved as follows. The noise variance $\sigma_m$, $m=0, \ldots, M-1$ is an optional set of parameters needed only to achieve optimal accuracy. The present invention functions properly if am is an arbitrary constant, for example m=1/SIR where the SIR is signal-to-interference ratio specification for the SAR system. Actual SIR may also be estimated for each image (or even locally within an image) by several alternative means, for example, by measuring contrast ratio between low-return areas and average clutter or by examining residuals in the elevation estimation process.

Linear phase matching (step 32) is achieved as follows. The SAR images may have systematic phase differences because of slight differences in collection geometry, slight differences in radar hardware between channels, or processor-induced error. The method 20 corrects these systematic phase differences. The linear phase matching parameters are estimated for $m=1, \ldots, M-1$, for all but the first image. First, the following pairwise interferogram is computed $$A_{m0}(r,v) = A_m(r,v)A_0^*(r,v). \quad (3)$$

Linear phase is estimated by summing sample-pair products of the interferogram and then computing the phase of this sum. Specifically, the range component is $$S_{rO} = \sum_{r,v} A_{mO}(r, v) A_{mO}^*(r-1, v) \quad (4)$$

with phase computed as $$s_{rm} = \arctan(I(S_{rO}), R(S_{rO})), \quad (5)$$

where R and I denote the real and imaginary parts of a complex number, respectively. The azimuth component is $$S_{v0} = \sum_{r,v} A_{m0}(r, v) A_{m0}^*(r, v-1) \qquad (6)$$

with phase computed as $$s_{vm} = \arctan(I(S_{v0}), R(S_{v0})). \qquad (7)$$

Additional interferograms may be applied in the phase matching step 32 for greater accuracy, e.g. through a least-squares fit based on all $A_{mn}$ for all m,n, but with greater computational cost.

The following correction is then applied $$A_m(r,v) \leftarrow A_m(r,v) \exp\{j(s_{rm}r + s_{vm}v)\} \qquad (8)$$

for m=1, ..., M−1. This correction may be combined with the gain matching of equation (2) if desired.

Interferometric phase-difference scale factor ratio estimation is achieved as follows. It is necessary to determine the ratio of effective interferometric phase-difference scale factors (grazing angle differences)

$$b_m = B_{0m}/B_{01} \qquad (9)$$

between each image-pair. First, the second moment of the phase derivatives in range for each interferogram is calculated:

$$P_m = \frac{1}{K} \sum_{r,v} [\phi_r(r, v)]^2 \qquad (10)$$

where $$\phi_r(r,v) = \arctan\{I(\alpha_{v0}), R(\phi(r,v)\} \qquad (11)$$

and $$\alpha = A_{m0}(r,v) A_m{}^*{}_0(r-1,v). \qquad (12)$$

Then the estimated phase-difference scale factor ratio is the ratio of the second moments $$b_m = P_m/P_1 \qquad (13)$$

for m=1, ..., M−1 with $b_1=1$. The common divisor $B_{01}$, which may be determined by conventional methods, is the factor that scales raw elevation estimates u into calibrated height z.

The effective interferometric phase-difference scale factor $B_{0m}$ determines the ratio between elevation derivatives and interferogram phase derivatives. The phase derivatives of different interferograms are therefore proportional to each other and the proportionality constant is the phase-difference scale factor ratio $b_m$. That ratio may be determined by a least-squares fit between the phase derivatives of the different interferograms. The above-described processing results as a special case of the least-squares fit. Additional interferograms (e.g. $A_{mn}$ for all m,n) and phase derivatives in azimuth may be applied in this phase-difference scale factor estimation process to provide for greater accuracy. The phase derivatives are noisy and are unambiguous only where the elevation derivatives fall below a certain value. Therefore accuracy may also be enhanced by censoring areas where the phase derivative exceeds a threshold ($\approx*/2$) in any one of the interferograms.

Ordering images according to estimated phase-difference scale factors (step 34) is achieved as follows. First, the image-pair with the smallest effective interferometric phase-difference scale factor (i.e. grazing angle difference) is found. These are denoted as $A_0$ and $A_1$. The image that results in the smallest increase in the total elevation aperture is added to this list. This is repeated until no more images remain. This ordering helps to simplify subsequent processing steps.

The inputs to the atmospheric correction method 40 comprise a complex valued SAR image from each of three or more passes of a sensor over a target area, where each pass is separated in elevation in approximate accordance with a designed synthetic elevation aperture. The outputs of the atmospheric correction method 40 are a precision terrain elevation map, a coregistered SAR image, and a map of atmospheric inhomogeneities.

The elevation estimate and associated atmospheric inhomogeneity map obtained using the atmospheric propagation error mitigation processing method 42 may be used on a stand-alone basis or as an initialization to the a maximum likelihood elevation estimation method 43. The maximum-likelihood elevation estimation algorithm functions more effectively if given an initial elevation estimate and corrections for spatially-variant additive phase errors, e.g., due to atmospheric inhomogeneities. Other variations of maximum-likelihood estimation (i.e., using a correlator instead of a squared difference criterion) have the same properties and also benefit from the same initialization.

The present method 40 has the purposes and advantages of conventional interferometric SAR. In addition, it provides a more efficient means for obtaining extreme accuracy global coverage topographic data. It also provides an atmospheric error mitigation approach for near-term topographic mapping.

Long range standoff reconnaissance may be implemented using the present invention. A manned or unmanned SAR vehicle may be operated to produce a plurality of SAR images at different grazing angles. In this regime the present invention provides precision maps and other intelligence data. The first two passes produce digital terrain elevation data with a dominant error resulting from to atmospheric inhomogeneities. For broad area mapping in strip map mode, a third pass allows the atmospheric error component to be reduced to the point where it no longer is the dominant error source. For mapping of high value targets in spotlight modes, two passes are used to collect a minimum of two pairs of images from different azimuth angles. The first pair is obtained using a short baseline and subsequent pairs are obtained with increasingly larger baselines by commanding the collection platform to climb to a higher altitude.

A detailed discussion of the processing performed in the present method 40 follows. The physical basis for atmospheric error mitigation and retrieval will first be discussed.

The method 40 allows the use of a larger elevation angle difference so that atmospheric errors do not scale into a large elevation error. Initialization using an image pair with a small elevation angle difference allows ambiguity resolution for steep terrain and buildings, and the like, and allows the retrieval of composite atmospheric inhomogeneity measurements.

This may be understood by comparing the phase difference between three images ($A_0, A_1, A_2$), where the pair ($A_0, A_1$) have a small elevation angle difference $\Delta\phi_{01}$ and the pair ($A_0, A_2$) have a large elevation angle difference $\Delta\phi_{02}$. A simplified model for the phase differences between the $m^{th}$ and $n^{th}$ images is given by $$\phi_{m,n} = \frac{4\pi \Delta \phi_{m,n}}{\lambda} z + \phi_{atmm} + \phi_{atmn}$$

where z denotes elevation to be measured, $\lambda$ denotes the radar wavelength, and $\phi_{atmn}$ for n=0, 1, 2 is the phase error due to atmospheric propagation. The standard deviation of $(\phi_{atm1} - \phi_{atm0})$ and $(\phi_{atm1} - \phi_{atm0})$ are the same, on average, denoted by $\sqrt{2}\sigma_{atm}$. An evaluation of the elevation error standard deviation $\sigma_{mn}$ attributable to atmospheric effects between the $m^{th}$ and $n^{th}$ image indicate $$\sigma_{m,n} = \frac{\lambda}{4\pi \Delta \phi_{m,n}} 2\sigma_{atm}$$

and therefore $$\sigma_{02} = \frac{\Delta \sigma_{01}}{\Delta \sigma_{02}} \sigma_{01}$$

for a reduction in atmospheric propagation error proportional to the increase in elevation angle difference obtained with the third pass. For example, an increase of $\Delta \phi_{02} = 4\Delta \Delta \phi_{01}$ results in a four-fold error reduction. An example design using three passes with $\Delta \phi_{01} = 0.05$ degrees, $\Delta \phi_{02} = 0.20$ degrees, operating at X-band with three meter resolution is able to resolve the height of buildings and steep terrain much more effectively than a two pass long-baseline collection ($\Delta \phi_{02} = 0.20$ degrees) while reducing atmospheric error dramatically relative to a two pass short-baseline collection ($\Delta \phi_{01} = 0.05$ degrees). In practice, the phase terms above are obtained by low-pass filtering of complex interferograms.

The processing method 20 shown in FIG. 1 is adapted to spatially correlated, high variance phase errors attributable to atmospheric inhomogeneities. FIG. 1 shows the overall structure of the method 20 and illustrates the use of the atmospheric propagation error mitigation processing method 42 to provide stand-alone capability and an initialization input to the maximum-likelihood elevation extraction processing 43. The atmospheric phase error extracted in the atmospheric propagation error mitigation processing method 42 provides a spatially-variant phase correction required by the maximum-likelihood elevation estimation processing 43 which, in turn, refines the initial elevation map using all of the available images simultaneously. The maximum-likelihood processing 43 is computationally demanding, so it is advantageous applied in problematic areas, such as in mapping buildings and other areas with elevation discontinuities.

FIG. 2 shows an expanded block diagram of the elevation extraction algorithm implemented in the atmospheric propagation error mitigation processing method 42 for the case of three coherent images (coherent image triples) given by $A_0$, $A_1$, and $A_2$. The atmospheric propagation error mitigation processing method 42 comprises processing three coherent images ($A_0$, $A_1$ and $A_2$) in pairs ($A_0$, $A_1$) and ($A_0$, $A_2$) using an interferogram 51, 51a. Outputs of the interferograms 51, 51a are then filtered 52, 52a. The output of the filter 51 that processes the first pair of images ($A_0$, $A_1$) is processed to unwrap the phase 53 of the image to produce a real-valued reference phase image. The real-valued reference phase image is then scaled by the baseline ratio 54.

The scaled real-valued reference phase image is then used to remove the phase reference function 55 from complex interferogram derived from the second pair of images ($A_0$, $A_2$). The output image produced by the remove phase reference function 55 is processed to unwrap the phase 57 thereof to produce a real-valued phase image. The phase images output from the scale by baseline ratio step 54 and the unwrap phase step 57 are added 56 to produce a terrain elevation map.

The output image produced by the remove phase reference function 55 is also filtered by a complex Weiner filter 58 to produce a filtered complex interferogram. The filtered complex interferogram is processed to unwrap the phase 59 thereof to produce a real-valued phase image comprising an atmospheric turbulence map.

The specifics of each processing step are described below. The interferogram 51 is a pixel-by-pixel conjugate product of two images ($A_0$, $A_1$) resulting in a single complex image output, referred to as a complex interferogram. The filter 52 is a standard two-dimensional low-pass filter is applied to the complex interferogram. The unwrap phase step 53 computes the phase of each complex pixel and reconstructs the absolute phase, up to a single additive constant. There are many well-known variants that implement this function.

In the scale by baseline ratio step 54, the first input is an unwrapped phase image (real-valued). The second input is a scalar value given by the ratio of the grazing angle differences between ($A_0$, $A_1$) and that of ($A_0$, $A_2$). That is, each pixel of the input phase image is multiplied by the scale factor. The remove phase reference step 55 has two input images, a complex interferogram and a real-valued reference phase image. The output of the remove phase reference step 55 is a complex image whose phase is that of the complex input image minus the reference phase image.

For the complex Wiener filter 58, the input is a complex interferogram and the output is a filtered complex interferogram. The filter characteristic of the Wiener filter 58 is determined from power spectral density models for the "signal" (the atmospheric turbulence effect) and the noise (the broadband noise in the long-baseline interferogram from ($A_0$, $A_2$) with additional phase noise due to scaled phase error from the short-baseline interferogram from ($A_0$, $A_1$)).

The Wiener filter 58, given models for signal and noise spectra, is well known. The power spectrum of the atmospheric turbulence effect is highly dependent on meteorological conditions. The power spectrum may be obtained either as a fixed design based on average measurements of turbulence spectra reported in the literature or by fitting a spectral model to the output of the phase reference removal function. Information on the effects of imaging through atmospheric turbulence can be found in R. L. Fante, "Turbulence-Induced Distortion of Synthetic Aperture Radar Images," *IEEE Trans. Geocsience and Remote Sensing*, Vol. 32, pp. 958–960, July 1994 and J. W. Goodman, *Statistical Optics*, NY: John Wiley & Sons, 1985, and citations therein, for example.

In the add phase images step 56, the inputs are two real-valued images and the output is a real-valued image, the sum of the two input images and is proportional to terrain elevation.

Referring to FIG. 3, it illustrates a processing method 43 that produces atmospheric error mitigation and turbulence map computations for the case of two coherent image pairs that are not necessarily all mutually coherent. The processing performed by the method 43 shown in FIG. 3 is substantially identical to the processing described with reference to FIG. 2, except that a two image pairs ($A_0$, $A_1$) and ($A_2$, $A_3$) that are not necessarily mutually coherent are processed.

For example, suppose two passes are used to collect a minimum of two pairs of images from different azimuth angles. The first pair is obtained using a short baseline and subsequent pairs are obtained with increasingly larger baselines by commanding the collection platform to climb to a higher altitude.

The input images are routed to two parallel interferogram computation steps 51, 51a. The original arrangement ($A_0$, $A_1$), ($A_0$, $_2$) is replaced by ($A_0$, $A_1$), ($A_2$, $A_3$) and the phase scale factor is changed to $$\frac{\Delta\theta_{23}}{\Delta\theta_{01}}.$$

The maximum likelihood formulation described in U.S. patent application Ser. No. 08/249,762 assumed a high degree of coherence between all images. When all pairings are not mutually coherent an alternative, well-known formulation applies, where the coherence properties are accounted for in a covariance matrix.

The processing method 43 shown in FIG. 2 (using a simple low-pass filter in place of the Wiener filter 58) was implemented and tested. A subjective improvement resulted. Lack of ground truth and use of the least-squares phase unwrapping step 53, which causes low frequency distortion hard to distinguish from atmospheric effects, precluded a valid quantitative measurement of the improvement.

Thus, a single-antenna multiple-pass interferometric synthetic aperture radar that mitigates atmospheric propagation error has been disclosed. It is to be understood that the described embodiment is merely illustrative of some of the many specific embodiments that represent applications of the principles of the present invention. Clearly, numerous and other arrangements can be readily devised by those skilled in the art without departing from the scope of the invention.

What is claimed is:

1. A signal processing method for use with a single antenna, multi-pass synthetic aperture radar (SAR), said method comprising the steps of:

processing raw synthetic aperture radar data to produce a plurality of complex synthetic aperture radar images therefrom;

processing the complex synthetic aperture radar images to produce a plurality of linear phase matched complex synthetic aperture radar images; and processing the plurality of linear phase matched complex synthetic aperture radar images to produce a terrain elevation map, a coregistered SAR image, and a map of atmospheric inhomogeneities.

2. The method of claim 1 wherein the plurality of linear phase matched complex images comprises three coherent images, and wherein the step of processing the three coherent images comprises the steps of:

computing first and second complex interferograms derived from the three coherent images;

processing the respective complex interferograms using first and second filters;

unwrapping the phase of the image output by the first filter to produce a real-valued reference phase image;

scaling the real-valued reference phase image by the baseline ratio;

removing the phase reference function from the complex interferogram output by the second filter;

processing the output image produced by the remove phase reference function to unwrap the phase thereof to produce a real-valued phase image; and adding the phase images output from the scale by baseline ratio step and the unwrap phase step to produce a terrain elevation map.

3. The method of claim 2 that further comprises the steps of:

filtering the output image produced by the remove phase reference function using a complex Weiner filter to produce a filtered complex interferogram; and processing the filtered complex interferogram to unwrap the phase thereof and produce a real-valued phase image comprising an atmospheric turbulence map.

4. The method of claim 1 wherein the plurality of linear phase matched complex images comprises four images that are not necessarily mutually coherent, and wherein the step of processing the four coherent images comprises the steps of:

computing first and second complex interferograms derived from selected pairs of the coherent images;

processing the respective complex interferograms using first and second filters;

unwrapping the phase of the image output by the first filter to produce a real-valued reference phase image;

scaling the real-valued reference phase image by the baseline ratio;

removing the phase reference function from the complex interferogram output by the second filter;

processing the output image produced by the remove phase reference function to unwrap the phase thereof to produce a real-valued phase image; and adding the phase images output from the scale by baseline ratio step and the unwrap phase step to produce a terrain elevation map.

5. The method of claim 2 that further comprises the steps of:

filtering the output image produced by the remove phase reference function using a complex Weiner filter to produce a filtered complex interferogram; and processing the filtered complex interferogram to unwrap the phase thereof and produce a real-valued phase image comprising an atmospheric turbulence map.

* * * * *